Jan. 30, 1962    H. J. JONES ET AL    3,018,962
APPARATUS FOR DETERMINING THE CORRELATION
COEFFICIENTS OF DATA

Filed Oct. 8, 1954                5 Sheets-Sheet 2

INVENTORS
HAL J. JONES AND
BY JOHN A. MORRISON, JR.

ATTORNEYS

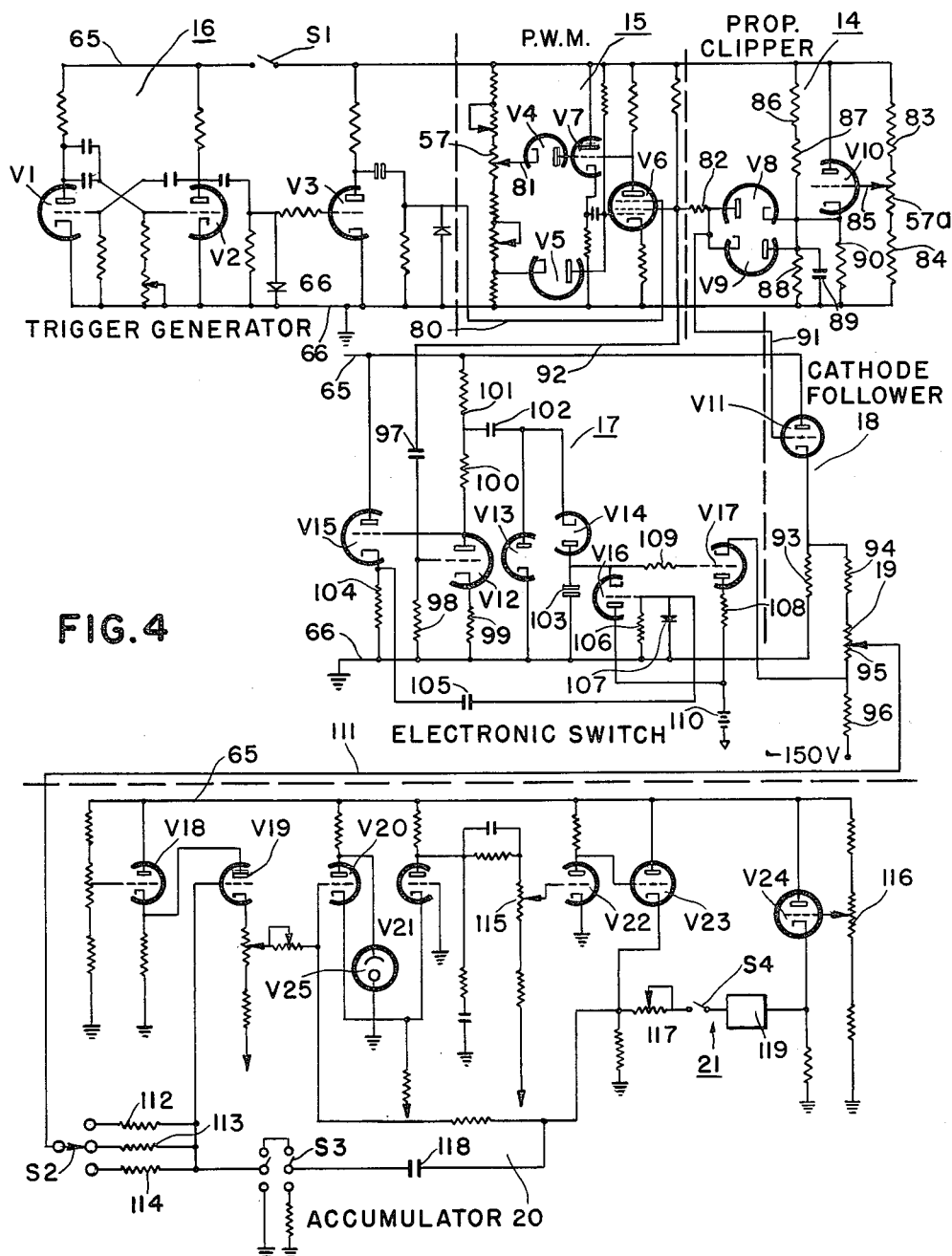

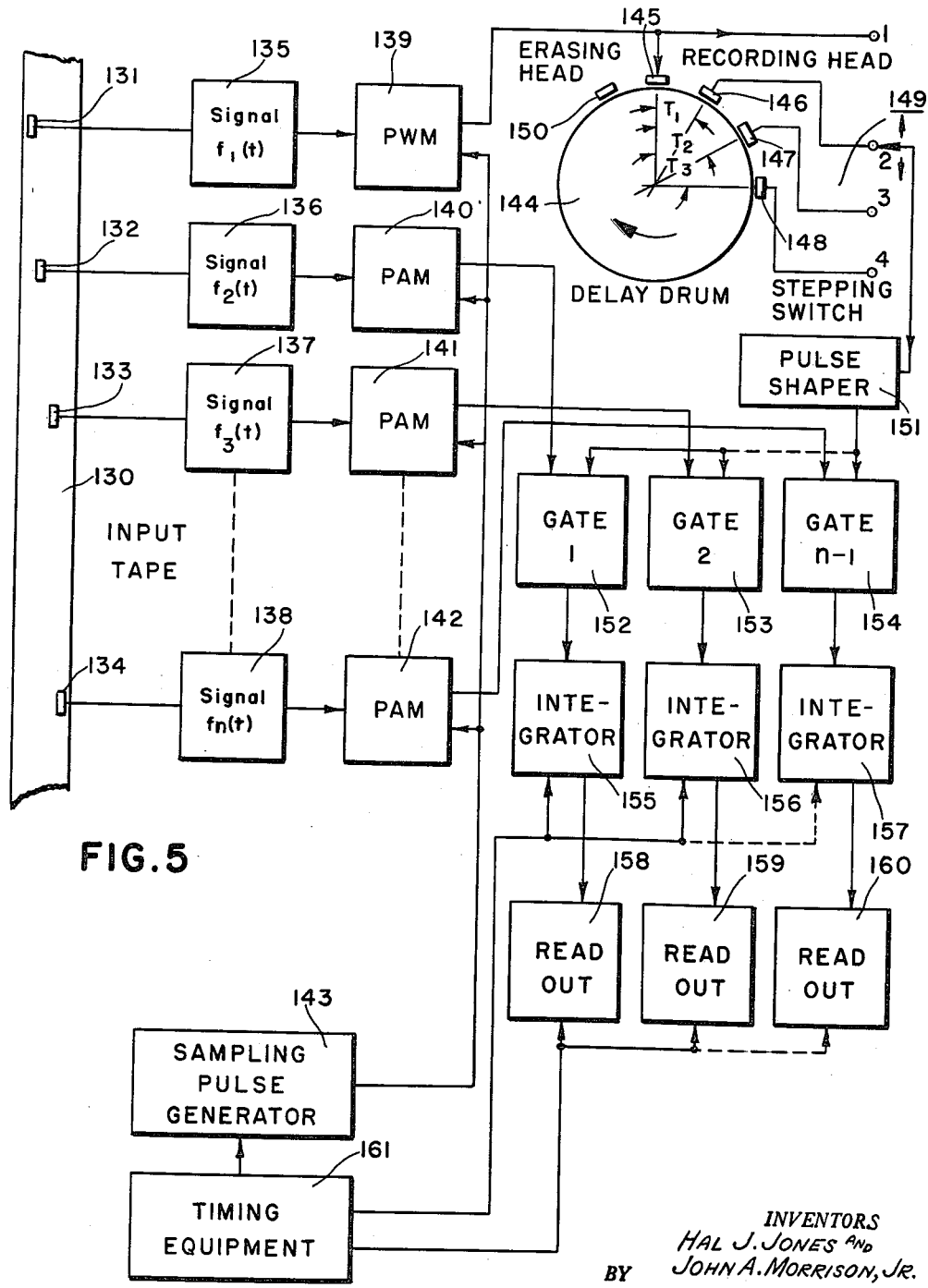

United States Patent Office 3,018,962
Patented Jan. 30, 1962

3,018,962
APPARATUS FOR DETERMINING THE CORRELATION COEFFICIENTS OF DATA
Hal J. Jones and John A. Morrison, Jr., Dallas, Tex., assignors to Texas Instruments Incorporated, Dallas, Tex., a corporation of Delaware
Filed Oct. 8, 1954, Ser. No. 461,234
9 Claims. (Cl. 235—181)

This invention relates generally to a method and apparatus for analyzing geophysical data and more specifically, to a method and apparatus for anlyzing geophysical data whereby the analysis is accomplished by determining a series of autocorrelation coefficients or crosscorrelation coefficients from and related to seismic geophysical data.

The method most commonly used to generate waves for seismic surveying purposes is the detonation of an explosive charge located either on or above the surface of the earth or in a hole drilled in the earth. On detonating the charge, a portion of the waves generated travel in a more or less direct path from the charge to the seismometers while another portion of the waves travel into the earth and are reflected back to the seismometers from layers where a change in velocity occurs. The seismometers pick up the direct traveling waves plus the reflected waves and the various combinations of waves received at the seismometers are converted into electrical signals which are then amplified and recorded on a visible or reproducible type record. Thus, it follows that the recording made after the shot is fired consists of waves containing no useful information or "noise" and reflected waves containing useful information or a "message." If the disturbance recorded by a seismometer moving in response to a seismic blast is defined as "signal," the general type of signal is made up of the message and noise and may be expressed as:

$$S = M + N$$

Correlation methods have long been used to aid in the interpretation of seismic exploration data, an example of this being the record-picking procedure in which visual and subjective criteria are employed in an effort to identify and track seismic events of interest from trace-to-trace on a seismic record and from record-to-record over a seismic prospect. However, in many areas, the noise components of the signal become so strong that it is difficult to identify and track the message employing the usual visual and subjective methods of record analysis. The threshold level seems to be reached where the message to noise ratio is 1 to 1 and thus, below this ratio, the visual inspection method normally employed in correlating seismic records cannot be used to reliably detect the message.

Therefore, in order to extend the visual correlation range of seismic records where the message component is equal to or less than the noise component, certain parameters are computed according to the theory of this invention which provide a quantitative measure of the correlation either between two sets of data or between two portions of the same set of data taken in spaced relationship. According to this theory, in computing the parameters for two sets of data which, for example, may be two traces on a seismic record, a time section of the seismogram trace extending from time $t_0$ to time $t$ may be regarded as composed of a sequence of discrete points $y_i$ or as a continuous disturbance $y_{(t)}$. One measure of the coherency between two such sets of data is the cross-correlation coefficient which for the discrete finite case may be written as $$\Phi_{YZ}(K\tau) = \frac{1}{N - M\tau} \sum_{i=1}^{N-M\tau} Y_i Z_{i+K\tau}$$

where: $y_i$ and $z_i$ = trace amplitudes at equally spaced time points measured from the two traces to be correlated,
$\tau$ = time delay, and
$K = -M, -(M-1) \cdots 0, 1, 2, 3 \cdots M$ For the continuous case composed of the continuous distance $y_{(t)}$ extending over a period of time T, the cross-correlation coefficient may be written as $$\Phi_{YZ}(\tau) = \frac{1}{T} \int_0^T Y(t) Z(t+\tau) dt$$

By shifting the time delay $\tau$ between the two sets of data and correlating successive sections of the seismogram of equal time lengths, a sequence of coefficients or a cross-correlation function is obtained. The properties of these coefficients are such that if the traces being compared are pure sinusoids the trace amplitudes at any point on the traces may be written as $$Y = A \cos(wt + \delta)$$
$$Z = B \cos(wt + \theta)$$

and the cross-correlation coefficients may then be written as $$\Phi_{ZY}(\tau) = \frac{AB}{2} \cos(wt + \delta - \theta)$$

Thus, the cross-correlation coefficients are sensitive to frequency coherency between two sets of data and also provide information as to time differences between frequencies common to the two sets of data. Since any time sequence of data such as a seismogram trace may be regarded as composed of a large number of sinusoidal components, the cross-correlation provides a sensitive measure of the coherency or correlation between the two sets of data.

When the two sets of data to be compared are derived from the same master set of data, the correlation coefficients are obtained by comparing equal sections of the set of data extending from time $t_0$ to time $t$ but with a particular time delay between the sets of data. The coefficients obtained in this manner are called autocorrelation coefficients. Thus, where the traces may be regarded as composed of a sequence of discrete points $y_i$ taken at equally spaced time points, the definition is $$\Phi_{YY}(K\tau) = \frac{1}{N - M\tau} \sum_{i=1}^{N-M\tau} Y_i Y_{i+K\tau}$$

and, where the trace amplitude may be considered as continuous over the lengths of record under comparison, the definition is $$\Phi_{YY}(\tau) = \frac{1}{T} \int_0^T Y(\tau) Y(t+\tau) dt$$

The particular parameters described and the general method of analysis are not novel with this invention but have been employed in the field of statistical analysis using both analog and digital computers. However, even though the computations performed by the method and apparatus of this invention could be carried out on a digital computer, a time consuming transcription step would be required wherein the input data would have to be converted from analog to digital form. Further, as to the prior art analog computers, none are adapted for or suitable for performing the requisite computations within the seismic frequency band. Accordingly, the novelty of this invention lies in the application of statistical analysis to seismic exploration and in the system of instrumentation and procedures used to carry out the analysis.

It is therefore a principal object of this invention to provide a method and apparatus suitable for analyzing data made up of a desired message plus noise whereby the message can be separated from the noise even though the ratio of the message to the noise is very small. Stated more specifically, it is a principal object of this invention to analyze seismic exploration data in the form of seismograms, magnetic recordings, or photographic recordings by computing correlation coefficients which indicate the presence of a seismic message when the message in the signal is equal to or less than the noise.

It is a further object of this invention to compute the correlation between two different sets of data as cross-correlation coefficients, or in the alternative, the correlation between different portions of the same set of data in a time-spaced relationship as autocorrelation coefficients.

It is still another object of this invention to disclose analog computing equipment which comprises means to convert seismis exploration data into inputs in the form of electrical signals and compute and record parameters that can be expressed by equations of the form:

$$\Phi_{YZ}(K\tau) = \frac{1}{N-M\tau} \sum_{i=1}^{N-M\tau} Y_i Z_{i+K\tau} \text{ for cross-correlation}$$

and $$\Phi_{YY}(K\tau) = \frac{1}{N-M\tau} \sum_{i=1}^{N-M\tau} Y_i Y_{i+K\tau} \text{ for autocorrelation}$$

It is a still further and important object of this invention to disclose a method of analysis and apparatus suitable for use with multi-channel inputs which comprises multi-channel analog computers and means for indicating the computed correlation coefficients.

The above objects will be clarified and other objects made known by the following description when taken in conjunction with the drawings in which:

FIGURE 4 is a schematic diagram showing the multiplier and integrator circuits used in the correlator; and FIGURE 5 is a block diagram illustrating a multi-channel correlator.

Figure 1:
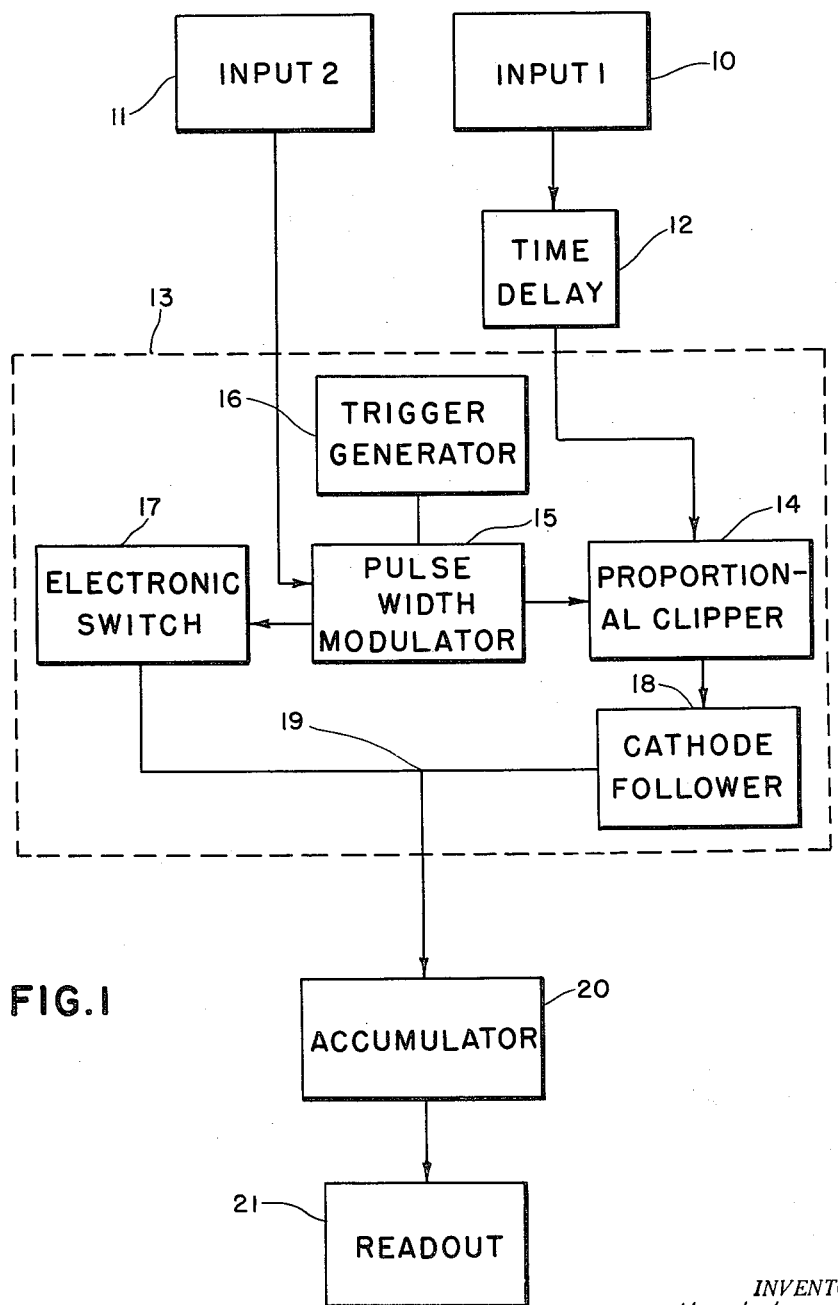
FIGURE 1 is a block diagram of a two-channel correlator suitable for carrying out a correlation analysis directly from seismic records.

Referring now to FIGURE 1, a two-channel correlator is shown which is suitable for carrying out a correlation analysis from various forms of data such as from seismic records for an example. In the block diagram, the two-channel correlator is comprised of the data input stages 10 and 11 and an analog computer consisting essentially of multiplying circuits indicated generally by the numeral 13 and integrator stages indicated by the accumulator 20. The input stages are devices capable of detecting recorded data and converting it into electrical signals which are then fed to the multiplier and integrator stages of the computer. One channel of the computer is a pulse width modulator 15 triggered at a fixed rate by trigger generator 16 so that its output is a pulse of time duration proportional to the signal amplitude from input stage 11 at the sampling instant. This pulse is continuously slipped at a level depending upon the amplitude of the signals from input stage 10 by means of an amplitude modulator and proportional clipper stage 14. Consequently, the output of multiplier 13 is a pulse whose area is proportional to the product of the two inputs at the sampling time. The pulses from multiplier 13 are fed to accumulator 20 which is an electronic type integrator. The integrator, essentially a D.-C. amplifier shunted by a capacitor, charges at a rate proportional to pulse amplitude for a time equal to pulse duration. The capacitor is prevented from discharging between pulses so that the total charge on the capacitor after some time $t$ is proportional to the integral or sum of the products of the input signals over an interval of time $t$. At the end of this time interval, the capacitor discharges to a vacuum-tube voltmeter, a pen recorder, or some other device serving as readout 21.

Figure 2:
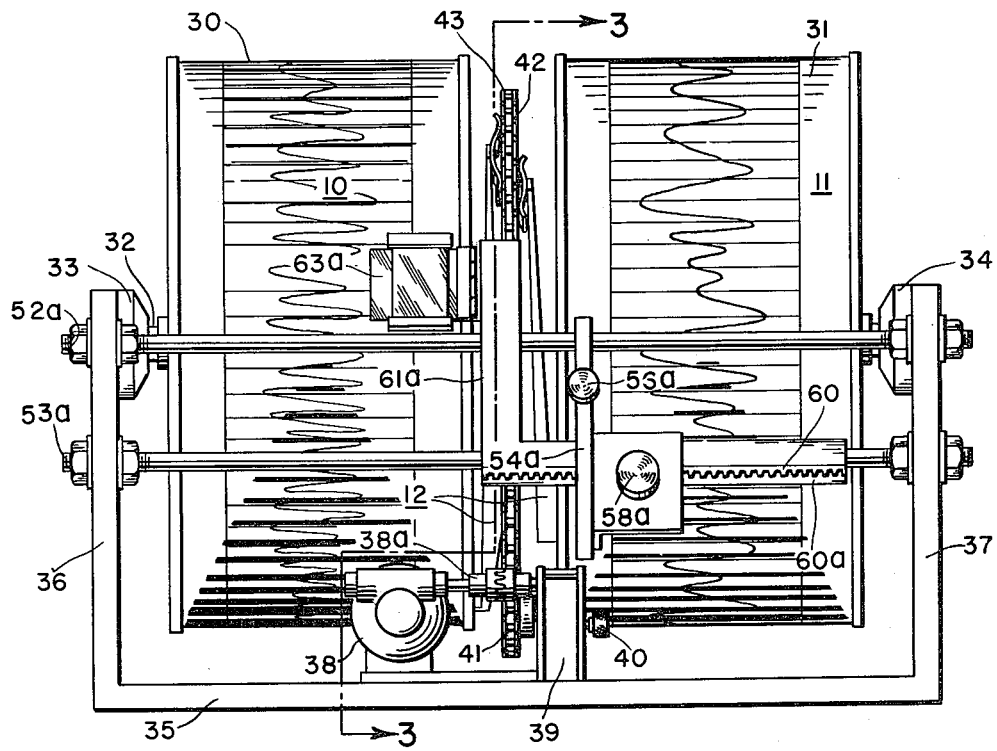
FIGURE 2 is a front elevation illustrating a curve tracer for supplying inputs to the two channels of the correlator shown in FIGURE 1.
Figure 3:
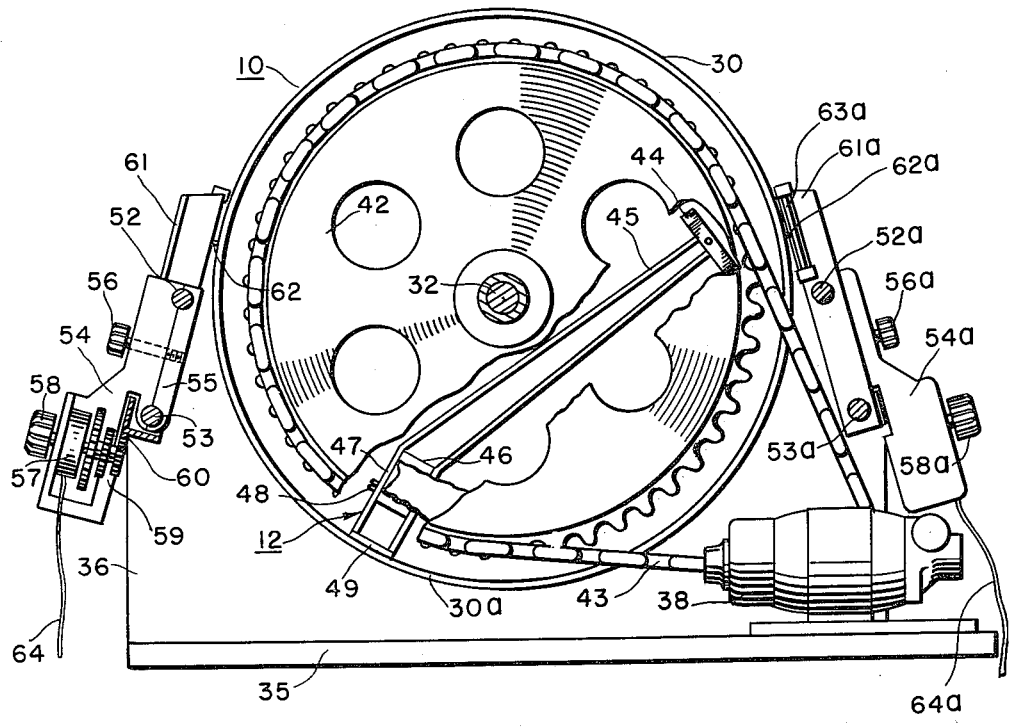
FIGURE 3 is a side view of the curve tracer taken along line 3—3 of FIGURE 2.

Beginning now the description of the two-channel correlator of the present invention in detail, the data input stages 10 and 11 and time delay 12 are shown in the front and side elevation views of FIGURES 2 and 3. The input stage device is essentially a curve tracer consisting first of two drums 30 and 31 loosely mounted on shaft 32 with a sprocket 42 keyed thereto and positioned between drums 30 and 31. Shaft 32 turns in bearings 33 and 34 which are respectively supported in the side members 36 and 37 attached to base 35. The output of motor 38, fixed to base 35, is delivered through output shaft and coupling 38a to a series of gears 39 providing a five-speed drive for spur gear 41. Knob 40 is used to select the gear ratio for driving gear 41 at the desired speed. The drive for shaft 32 is provided by chain 43 connecting sprocket 42 with spur gear 41.

In FIGURE 1, a time delay 12 is shown interposed between input stage 10 and the multiplier circuits 13. The time delay for the curve tracer input device is provided by the braking device shown in FIGURES 2 and 3 which connects the loosely mounted drums 30 and 31 with shaft 32. In this braking mechanism, a bracket 46 is attached to sprocket 42 and, by means of bolt 48, a channel-shaped section 47 is hinged thereto. Brake shoe 49 is fixed to one end of section 47 and arm 45 is attached to the other end but at an angle with the length of section 47. Spring 44 is attached at the end of and at right angles to the length of arm 45 so that it pushes against sprocket 42. When spring 44 is depressed, the angular movement of arm 45 and section 47 is sufficient to raise brake shoe 49 very slightly and out of contact with flange 30a on drum 30 thus permitting drum 30 to rotate freely on shaft 32. Conversely, when spring 44 is expanded normally, the spring pressure on arm 45 and section 47 forces brake shoe 49 into frictional engagement with flange 30a and drum 30 is thus engaged to rotate with the shaft. A similar mechanism not described is provided to release and rotate drum 31 with shaft 32. Such a mechanism permits the drums 30 and 31 to be rotated relative to each other and thus introduce any desired time delay between the seismic exploration data which is attached or placed around the circumference of the two drums.

The remainder of the data input mechanism is devoted to converting the seismic exploration data wound on the drums into electrical signals which thereby constitute the input signals to the computer. Two curve tracers are provided, one for use in connection with drum 30 and the other for drum 31, but located on opposite sides of the respective drums. A complete curve tracer is shown in detail by FIGURES 2 and 3 although FIGURE 3 shows both curve tracers oppositely mounted. Consequently, the curve tracer is described in terms of the left hand view of the tracer in FIGURE 3 but frequent reference should be made to the opposite hand view plus the front elevation view of FIGURE 2 for the sake of clarity.

A pair of parallel rods, 52 and 53, are supported on one side of drums 30 and 31 by the end members 36 and 37. A mounting bracket 54 is secured to parallel rods 52 and 53 by means of clamp bar 55 and bolt 56. Mounting bracket 54 supports a potentiometer 57 with a rotatable shaft controlled by means of a knob 58. Ganged to the rotatable shaft of potentiometer 57 are a series of gears 59 one of which engages a rack 60 formed along the underside of a right angle arm 61. Right angle arm 61 is movably mounted on the two parallel rods 52 and 53 so that a rotation of knob 58 causes arm 61 to move along the rods. A viewing plate 63 is hinged to the upper portion of arm 61 and mounted in the center of plate 63 is a pointer 62 which is in contact with the seismic record attached to the drum. The subscript "a" attached to the identical numerals are used to identify the similar components of the curve tracer not described.

The operation of the input stage is such that when a record is attached to each of the drums and the drums rotated at one of the fixed speeds, the pointers 62 and 62a are controlled by knobs 58 and 58a to follow the trace amplitudes on the seismic records. As the positions of the pointers are changed to follow the seismic trace, the output of potentiometers 57 and 57a varies in proportion to the movement of the pointers; consequently, the voltages measured across the potentiometers at any given instant are proportional to the trace amplitudes recorded on their respective seismic records. These voltages representing the seismic trace amplitudes are then fed to the computer circuits by leads 64 and 64a. Although the curve tracer described is manually controlled, it should be recognized that the traces could be followed automatically by some means such as a photoelectric curve tracer and therefore, the device is not to be considered as limited solely to the means shown.

From the curve tracer, the input signals are fed to the computer shown in FIGURE 4. The basic principal underlying these circuits is that of providing a repetitive train of pulses with each pulse having an amplitude proportional to the instantaneous value of one input function and a time duration proportional to the instantaneous value of the other input function. The area under each pulse is then proportional to the instantaneous product of the two input functions. To illustrate the manner in which the circuits of FIGURE 4 accomplish this purpose, the description will begin with trigger generator 16. Trigger generator 16 generates a pulse of approximately 10 c.p.s. by means of a multivibrator consisting of tubes V1 and V2. Such a multivibrator is well known in the art and no claim is made to the multivibrator per se. The multivibrator produces a wave which is rectangular in form through one-half cycle of the multivibrator and flat through the remaining half cycle. The rectangular wave form is differentiated in a circuit consisting of a condenser and a resistor to provide sharp peaked pulses of alternately positive and negative polarity to correspond with each abrupt change in voltage provided by the rectangular wave form of the multivibrator. The differentiated output wave is then fed to a diode which bypasses the positive pulses to ground and feeds the negative pulses to the grid of tube V3. The negative pulse to the grid of tube V3 results in a positive pulse at the plate of the tube and this pulse is again differentiated in a circuit consisting of a condenser and a resistor and any pulses of negative polarity remaining in the output wave are bypassed to ground by a second diode.

From trigger generator 16, the positive pulses are fed to a pulse width modulator 15 by means of lead 80. The pulse width modulator is a cathode coupled phantastron circuit, such circuits being well known in the art and described in volume 19, Chapter 3, MIT Radiation Laboratory Series and in the April 1948 issue of Electronics. Briefly describing the phantastron circuit, the primary component is a five-element tube V6 whose plate circuit is held to cutoff by the bias conditions of the control grid, the suppressor grid and the screen grid. The screen grid is connected with the positive B+ voltage supply 65 through a resistor so that a heavy current flows in the screen grid to cathode circuit and the screen grid is therefore at a positive potential. The control grid of tube V6 is biased negatively with respect to the cathode by the resistor and diode tube V5 connection between the B+ supply 65 and ground 66. The suppressor grid is connected by lead 80 to trigger generator 16 and is at ground potential except when a triggering pulse is transmitted by the trigger generator. Voltage is supplied to the plate of tube V6 by a connection to the B+ voltage supply 65 through a resistor and also through potentiometer 57 in series with diode tube V4. Potentiometer 57 is one of several resistors connected in series between the B+ voltage supply 65 and ground 66 and wiper arm 81 of potentiometer 57 is controlled by the movement of the curve amplitude tracing mechanism shown in FIGURES 2 and 3.

As a triggering pulse from trigger generator 16 is applied to the suppressor grid of tube V6, the amplitude of the positive pulse is sufficient to overcome the cutoff bias on the tube and current flows in such a manner that the voltage on the plate decreases linearly until the cutoff or bottoming voltage is reached. As the tube conducts, a positive voltage pulse appears at the screen grid, the duration of this pulse being a linear function of the voltage on the plate of tube V6 at the instant of triggering. This voltage on the plate of tube V6 is in turn the voltage controlled by the position of wiper arm 81 as it is moved in accordance with the amplitude of the curve being traced at that particular instant. A feed back path provided by tube V7 and a capacitor connected in the path from the plate to the grid is responsible for the almost linear fall of the plate voltage after the triggering pulse is applied. Thus, since the voltage at the plate of tube V6 is determined by trace amplitude at any particular pulse instant and because the plate voltage decreases linearly until the constant equilibrium point of the tube is reached, it follows that a positive voltage wave form of constant amplitude and of a width proportional to the voltage on the plate will appear at the screen grid of tube V6.

The rectangular voltage wave form at the screen of tube V6 is then fed simultaneously to the proportional clipper 14 and to electronic switch 17 by means of a lead 92. The purpose of electronic switch 17 will be described subsequently. The proportional clipper 14 consists of the twin diodes V8 and V9 separated from proportional width modulator 15 by means of an isolating resistor 82. The resistance of resistor 82 is sufficiently great to permit the proportional clipper to operate independently and without interference from extraneous signals from the proportional width modulator. The low power rectangular wave form passing through resistor 82 is applied to the plate of tube V8 and the cathode of tube V9. The cathode of tube V8 is then connected with the cathode of amplifier tube V10 which is plate connected to the B+ voltage supply 65 and cathode connected through resistor 90 to ground 66. The grid of tube V10 is controlled by wiper arm 85, a part of potentiometer 57a. Potentiometer 57a is connected in series with resistor 83 and resistor 84 and the three resistors then connected in series between the B+ voltage supply 65 and ground 66. The wiper arm 85 of potentiometer 57a is positioned by the curve amplitude tracing mechanism shown in FIGURES 2 and 3. The cathode of tube V9 is at a voltage above ground by an amount determined by the voltage drop across resistor 88 which is in series with resistors 86 and 87 connected between the B+ voltage supply 65 and ground 66. Condenser 89 is also connected from ground 66 to the plate of tube V9.

Proportional clipper 14 acts to clip the output wave from the phanastron at two voltage levels, the upper level at a voltage determined by the position of wiper arm 85 and the lower level at a voltage to remove any voltage dips in the wave form. For this particular circuit, the upper voltage level is variable between +100 and +200 volts while the lower level is established as +100 volts. Explaining how this clipping is accomplished, tube V10 acts as a cathode follower so that the voltage on the cathode follows the voltage on the grid. Since the grid voltage is controlled by wiper arm 85 of potentiometer 57a, the cathode voltage then is determined by the curve tracing mechanism. The cathode of tube V8 is connected to the cathode of tube V10 and consequently, its voltage is also determined by the curve tracing mechanism. Tube V8, being a diode, cannot conduct until the voltage on its plate exceeds the cathode voltage. Therefore, when the voltage of the rectangular wave from pulse width modulator 15 exceeds the voltage on the cathode of tube V8, the diode begins to conduct and the rectangular wave is clipped at some voltage between +100 and +200 volts as controlled by the curve tracing mechanism. The voltage at the plate of diode V9 is fixed at +100 volts by the resistor 88 and condenser 99; therefore, current flows in diode V9 until the voltage of the rectangular wave at its cathode reaches 100 volts and then ceases above that point because of the infinite impedance of a diode when the cathode is at a higher potential than the plate. Thus, at the junction of tubes V8 and V9, there is a rectangular wave whose width is a function of one input to the correlator and whose amplitude is a function of the other input to the correlator.

The clipped rectangular wave is then fed to the grid of tube V11 by means of lead 91. Cathode follower 18 is simply an amplifier tube with its plate connected to the B+ voltage supply 65 and its cathode connected to ground 66 through a resistor 93. The control pulses to the grid of tube V11 have a relatively low power and merely serve to control tube V11 to provide pulses of the same form but at a considerably higher power level.

The output from cathode follower 18 is to an electronic switch 17 in the path to the accumulator 20. The electronic switch performs two basic functions in that it brings the base line or lower voltage level of the pulses from the cathode follower down to ground and changes them from unidirectional positive signals to bidirectional signals so that the pulses which enter the integrator can either be positive or negative. The electronic switch accomplishes these purposes in the following manner.

The pulses from cathode follower 18 are applied to a circuit consisting of equal resistors 94 and 96 with the midpoint between these resistances being established by a variable resistor 95. In this particular correlator, the pulses leaving the cathode follower are at a voltage amplitude varying from +100 volts to +200 volts with a mean of +150 volts. In order to accomplish the function of changing the unidirectional positive signals to bidirectional signals, a negative voltage source of —150 volts is applied to the lower end of resistor 96. If the voltage of the pulse from the cathode follower is at +150 volts, the voltage fed to accumulator or integrator 20 by lead 111 will be zero. It follows then that as the voltage of the pulse rises to a positive 200 volts the pulse to the integrator will be positive while if the voltage from cathode follower 18 is below +150 volts the pulse to the integrator will be negative. Although fixed voltages have been set for the operation of the correlator of this invention, it is to be understood that these voltages have been determined as convenient operating levels and are not to be construed as limiting the invention to these voltages.

If didirectional signals are to be fed to the integrator circuits, it is necessary to bring the base line of the pulses from cathode follower 18 down to ground and the remainder of electronic switch 17 is provided for this purpose. This is accomplished by connecting the midpoint of resistor 95 to ground when there is no pulse from cathode follower 18 and by disconnecting the resistor from ground during the occurrence of the pulse. The use of a vacuum-tube, such as tube V17, as the switch was found to be necessary because of the large range of pulse time durations and because the pulses entering the integrator are required to be very flat, that is, have no detectable droop from the beginning to the end of the pulse. To open tube V17 as a switch during the occurrence of a pulse, a negative signal is applied to the grid of tube V17 to drive it well past cutoff and thus provide an infinite impedance to current flow. Further, to allow the tube to switch from the open to the closed position, means are provided to quickly discharge the negative signal from the grid of tube V17.

The negative signal which drives tube V17 to the cutoff point is obtained initially from pulse width modulator 15 through lead 92 as a positive pulse. This positive pulse is first fed by lead 92 to the electronic switch where it is coupled by means of condenser 97 and resistor 98 into the grid of tube V12 which tube acts simply as a phase inverter. Series resistors 100 and 101 are connected to the B+ voltage supply 65 and serve as the plate load resistance for tube V12 while resistor 99 is connected in series with its cathode to ground 66. From the junction of the two series resistors 100 and 101, the pulse is fed into a "box-car" circuit comprised of condenser 102, diodes V13 and V14, condenser 103 and amplifier tube V16. The negative voltage from tube V12 follows the low resistance path through diode V14 to charge condenser 103 and this charge on condenser 103 is applied to the grid of tube V17 through resistor 109 to cut of switching tube off. During the pulse condenser 103 is prevented from discharging by the high inverse resistance of diode V13 and also because of tube V16 being driven to the cutoff point. That tube V16 is driven to cutoff follows from its relation in the circuit to tube V15. Tube V15 is used as a cathode follower with its grid connected to the plate of tube V12 and its cathode connected through condenser V15 to the grid of tube V16. Since tube V15 is plate connected to the B+ voltage supply 65 and its cathode is connected in series with the resistor 104 to ground 66, the negative signal appearing at the plate V12 is transformed into a large negative signal at the cathode of tube V15 by virtue of the voltage drop across resistor 104. This negative voltage is applied to the grid of tube V16 through condenser 105 and thus drives it to cutoff. As the pulse passes and cathode follower V15 goes toward positive, the charge on condenser 105 attempts to follow and drive the grid of tube V16 positive but it is prevented from rising above ground by the action of rectifier 107 and resistor 106. Then when the grid of tube V16 reaches ground, condenser 103 discharges through the tube to remove the negative cutoff charge from the grid of switching the tube V17. To insure that the base line of the pulses is precisely at zero potential, a battery 110 is provided along with resistor 108 and adjustable potentiometer 95 in the path of switching tube V17 to ground.

From the cathode follower and switch, voltage pulses with an area proportional to the instantaneous product of two input functions are fed by lead 111 to the accumulator 20. These pulses pass first through switch S2 which selects the integrating time constant by introducing one of the resistors 112, 113, or 114, each with different resistance values, into the circuit. The accumulator is a conventional Miller type integrator well known in the art and need be described only briefly. The integrator is essentially a D.-C. amplifier comprised of tubes V18, V19, V20, V21, V22, and V25 and shunted by capacitor 118 which charges at a rate proportional to pulse amplitude for the duration of the pulse when switch S3 is closed to the integrating position. Capacitor 118 is prevented from discharging between pulses so that the total charge on the capacitor after some time $t$ is proportional to the integral or sum of the products of the two inputs over the time interval. The only novel feature of the amplifier is to be found in the input stage where tube V18 provides an adjustable plate supply voltage for tube V19 so that tube V19 is operated at that plate voltage which produces nearly a zero grid current. It is desirable to make the grid current of this tube as small as possible because grid current develops a D.-C. voltage at the input to the integrator and causes errors in integration.

The readout stage 21 of the computer consists primarily of tubes V23 and V24 controlled by adjustable potentiometers 115 and 116 respectively, the indicating meter 119, and switch S4 and adjustable potentiometer 117. The adjustable potentiometers 115 and 116 are used to adjust the output level of amplifier tubes V23 and V24 so that the indicating meter 119 is not deflected from its zero scale position. This is accomplished by closing switch S4 and adjusting the wiper arms until the indicating meter 119 is balanced at zero. Adjustable potentiometer 117 is the sensitivity control for the meter. When capacitor 118 has been charged by a succession of pulse computations over a period of time $t$, switch S3 is thrown to the ground position thereby discharging capacitor 118 and allowing meter 119 to read the cumulative charge.

The method of using the above described apparatus of the present invention begins with placing a visible trace record on each drum in order that the pointers may be controlled to follow the amplitude of the traces and thus provide electrical signal inputs to the multiplier and integrator circuits. If the autocorrelation coefficient is to be obtained for one trace, a duplicate copy of that trace is made and attached to both drums. By comparing one record with itself except shifted in time relationship, a series of autocorrelation coefficients may be obtained.

When it is desired to obtain a cross-correlation analysis of a given set of data, it has been found advantageous in one method to use a pilot message in the computation of cross-correlation coefficients. For example, in reflection prospecting this pilot signal may be the reflected transient as defined on good records or in good areas near the poor record area where the data to be analyzed is obtained. The pilot signal is placed on one drum, the data on the other drum and the pilot signal cross correlated against successive time intervals equal in length to the time length of the pilot signals. A typical computational formula is $$\Phi_{M'S} = \frac{1}{N}\sum_{i=1}^{N} S_i M'_i$$

where:
$S$ = Signal
$M'$ = Message
$N$ = Noise

A plot of the coefficients obtained according to the above formula against record time forms a correlogram which may be regarded as a new seismic trace. Peaks on the correlogram correspond to a high amount of coherency between the trace and the pilot message and usually indicate the presence of messages similar to the pilot message in the data trace. Since the pilot message may be considered as being correlated against itself, the cross-correlation coefficient of the above equation may be expanded as a combination of the message autocorrelation and message noise correlation as follows $$\Phi_{M'S} = \Phi_{M'M} + \Phi_{M'N}$$

where $S = M + N$

If the message-to-noise ratio before correlation is defined as $$R_i = \frac{M\rho}{N_{RMS}}$$

with subscript $\rho$ denoting peak message amplitude, and the message-to-noise ratio after correlation is defined as $R_0 = \Phi M'M\rho/\Phi M'N_{(RMS)}$, practice shows that $R_0$ is often greater than $R_i$. This indicates that cross-correlation improves the message-to-noise ratio and thus acts as a band pass filter in permitting identification of messages which could not be detected visually. In actual practice, messages have been detected where the message-to-noise ratio was $-12$ db or less. It should be noted, however, that the effectiveness of the method depends upon the degree of coherency between message and noise, or stated differently, upon the lack of coherency between message and noise.

It is also clear that the cross-correlation procedure could be applied in another fashion simply by cross-correlating time sections of two sets of data. In this situation, there are two signals with a common message M—

$$S_1 = M + N_1$$
$$S_2 = M + N_2$$

and the cross-correlation coefficient is given by $$\Phi_{S_1S_2} = \Phi_{MM} + \Phi_{MN_1} + \Phi_{MN_2} + \Phi_{N_1N_2}$$

Thus, the correlogram obtained from a series of these coefficient computations depends upon the correlation of the two noise components, $N_1$ and $N_2$, as well as the two message cross-correlations and is therefore, less sensitive to the presence of M than in the case where the pilot message is used.

Although the two-channel correlator described in FIGURES 1 through 4 is satisfactory for computation of autocorrelation and cross-correlation coefficients, there are instances where a multichannel correlator capable of automatic operation is desirable. Such a multichannel correlator is shown in FIGURE 5. Initially, the input signals to the multichannel correlator are recorded in suitable form on a magnetic tape 130 which, for the purpose of the correlator, is mounted so that it can be played back and the recorded data repeatedly reproduced. Though a magnetic tape is shown in FIGURE 5, it should be recognized that a reproducsible medium in any suitable form can be used such as discs or cylinders. As the tape is played back, the pickup heads 131 through 134 detect the $f_1(t)$ through $f_n(t)$ signals each recorded in a separate channel on tape 130. Signals $f_1(t)$ through $f_n(t)$ are fed through decoding means, represented by blocks 135 through 138 respectively, which decoding means may be for example an FM or AM demodulator and amplifier of the type well known in the art.

The signal from block 135, signal $f_1(t)$, is fed into pulse width modulator 139 where a pulse from sampling pulse generator 143 triggers a phantastron circuit such as described in FIGURE 4 to produce a pulse whose width is proportional to the voltage of the input signal $f_1(t)$ at the instant the triggering pulse arrives. The output from pulse width modulator 139 is fed to a recording head 145 mounted adjacent to and in close proximity to the periphery of a rotating delay drum 144. The pulses also feed to position 1 of stepping switch 149. Delay drum 144 is suitably coated with a magnetic material so that the pulses from modulator 139 are recorded on the drum. The speed of rotation of drum 144 is maintained at a very constant speed and can be controlled to make one complete revolution as input tape 130 makes one complete pass underneath the pickup heads although in its preferred form, delay drum 144 rotates at a much higher speed. The pulses recorded on delay drum 144 by recording head 145 are picked up by a series of detecting or pickup heads, 146, 147, and 148, spaced at successively greater angular distances $T_1$, $T_2$ and $T_3$ around the drum from recording head 145 to provide the time delays for correlation of the data, and the pulses then fed to a multiposition stepping switch 149.

In FIGURE 5, stepping switch 149 is shown receiving pulses from pickup head 146 at switch position 2, pickup head 146 being positioned with a delay time $T_1$ from recording head 145. Stepping switch 149 remains in position 2 until input tape 130 has made one complete pass or revolution and at that time automatically switches to position 3 and receives signals from pickup head 147 located at a delay time $T_2$ from recording head 145. This procedure is repeated for each of the remaining switch positions including position 1 as the initial starting point and, though only four positions are illustrated, it is clear that switch 149 may have any number of positions.

Stepping switch 149 is connected with pulse shaper 151 where the signals are restored to the shape and width of the waves leaving pulse width modulator 139 and from pulse shaper 151, the signals are fed simultaneously to gates 1, 2 and $n$-1 designated respectively by the numbers 152, 153, and 154.

Concurrently with the signals from block 135 to pulse width modulator 139, the signals from blocks 136, 137 and 138 are being fed to the pulse amplitude modulators 140, 141 and 142 respectively. For a description of pulse amplitude modulators suitable for use in this invention, see Radiation Laboratories Series, vol. 24, Sections 2.7 and 10.1. At the same instant a triggering pulse is delivered to modulator 139, sampling pulse generator 143 is also delivering pulses to the pulse amplitude modulators. When thus triggered, modulators 140, 141, and 142 produce pulses of longer duration than the longest pulse output from pulse width modulator 139 but at amplitudes corresponding to the amplitude of the signal voltages from blocks 136, 137 and 138. The amplitude pulse from pulse modulator 140 is fed to gate 1, the pulse from modulator 141 is fed to gate 2 and the pulse from modulator 142 is fed to gate $n-1$. The symbol $n$ is used merely to indicate that any number of channels may be used in the correlator subject only to the practical limitations imposed by the space required for each channel.

The pulses from pulse amplitude modulators 140, 141 and 142, being of a longer duration than the width of the pulses from pulse width modulator 139, arrive at gates 152, 153, 154 very slightly ahead of the pulses from the pulse shaper 151. The gates are multi-element vacuum-tubes wherein the amplitude modulated pulses are applied to the control grid and the width modulated pulses are applied to the suppressor grid. The bias conditions are so adjusted that the gates conduct only in the presence of a pulse on the suppressor grid. It thus follows that gates 152, 153 and 154 conduct for a period determined by the width of the pulses from pulse width modulator 139 and with an amplitude determined by the amplitude of the signals to modulators 140, 141 and 142. Therefore, the output of each gate is a rectangular wave with characteristics identical to those described in the circuit of FIGURE 4 and each wave then feeds into its respective integrator circuit 155, 156 or 157.

Integrators 155, 156 and 157 are of the D.-C. amplifier type shunted by a capacitor which is charged by each successive pulse arriving from its gate circuit. Integrators 155, 156 and 157 feed into readouts 158, 159 and 160 respectively. Timing equipment 161, connected to the integrators and to the readouts, times the computation of correlation coefficients and, at intervals corresponding to one pass of tape 130, discharges the integrators simultaneously into the readouts thereby recording the correlation coefficient computed. After the meters in the readout circuits record the coefficient computed by its integrator, timing equipment 161 advances the recording mediums of the meters a slight amount to receive the next coefficient from the integrators. An erasing head 150 is positioned slightly behind recording head 145 to remove all signals recorded on drum 144 thereby preventing the same signals from reaching the pickup heads in the computation of a single correlation coefficient.

From the foregoing description, it is apparent that any number of correlation coefficient may be computed by the multi-channel correlator, the number of coefficients depending only upon the number of pickup heads which can be physically spaced along the delay drum. The number of heads positioned on the delay drum can be increased by a staggered arrangement of pickup heads across its width thereby providing even smaller time delays between each pickup head and consequently a larger number of correlation coefficients. The multi-channel correlator described is suitable for providing cross-correlation coefficients; however, by making the pickup heads in contact with input tape 130 adjustable, any channel may be correlated against itself to provide autocorrelation coefficients and any channel may be cross-correlated against the other channels. Further, by suitable switching, a pilot signal can be fed into pulse width modulator 139 and thus permit the various channels to be cross-correlated against a pilot signal containing a typical message. Also, to increase the flexibility of the correlator, it is possible to so control the timing equipment that the correlation of data can be programmed, that is, any section of the data can be correlated as desired.

Thus, while the present invention has been described in two specific embodiments, it is obvious that numerous modifications can be made without departing from the scope of this invention which is to correlate data in time series form and thereby determine the presence of a message in a signal even when the message-to-noise ratio is very small. Accordingly, any modification which can be made to the invention as disclosed and covered in the appended claims is within the scope and intent of this invention.

What is claimed is:

1. Apparatus for analyzing data in time series form whereby correlation coefficients are computed for equal time length portions of said data to indicate the degree of correlation therebetween, the combination comprising a reproducible medium having recorded thereon at least one set of data in time series form, at least two means associated with said reproducible medium for detecting said recorded data, pulse sampling means, modulating means actuated by pulses from said sampling means to produce a series of pulses whose widths are proportional to the data amplitude at the instant of detection by one of said at least two detecting means, means recording said width modulated pulses on time delay means, a plurality of detecting means associated with said time delay means, said recording and detecting means together being capable of producing time delays from zero to times greater than the periods between sampling pulse time intervals, modulating means actuated by pulses from said pulse sampling means to produce a series of pulses whose amplitudes are proportional to the data amplitude at the instant of detection by the other of said at least two detecting means, switching means connecting said plurality of time delay detecting means one at a time to multiplier means, said multiplier means multiplying said series of width modulated pulses detected by the connected one of said plurality of time delay detecting means and said series of amplitude modulated pulses, means summing said multiplied pulses for the time length of the data portions to be correlated to obtain thereby correlation coefficients, and means for reading the sums of said multiplied pulses.

2. Apparatus for analyzing data in time series form as defined in claim 1, wherein one of said at least two means associated with said reproducible medium for detecting recorded data is adjustable.

3. Apparatus for analyzing data in time series form whereby correlation coefficients are computed for equal time length portions of said data to indicate the degree of correlation therebetween, the combination comprising a reproducible medium having recorded thereon multiple sets of data in time series form, a plurality of means associated with said reproducible medium for detecting said recorded data, pulse sampling means, modulating means actuated by pulses from said sampling means to produce a series of pulses whose widths are proportional to the data amplitude at the instant of detection by one of said plurality of detecting means, means recording said width modulated pulses on time delay means, a plurality of detecting means associated with said time delay means, said recording and detecting means together being capable of producing time delays from zero to times greater than the periods between sampling pulse time intervals, a plurality of modulating means actuated by pulses from said pulse sampling means to produce thereby pulse series whose amplitudes are proportional to the data at the instant of detection by the other of said plurality of detecting means, switching means connecting said plurality of time delay detecting means one at a time to multiplier means, said multiplier means multiplying said width modulated series of pulses detected by the connected one of said plurality of time delay detecting means with each of said amplitude modulated pulse series, a plurality of means summing said multiplied pulses for the time length of the data portions to be correlated to obtain thereby correlation coefficient, and a plurality of means for reading the sums of said multiplied pulses.

4. Apparatus for analyzing data in time series form whereby correlation coefficients are computed for equal time length portions of said data to indicate the degree of correlation therebetween, the combination comprising a magnetic medium having recorded thereon at least one set of data in time series form, at least two magnetic pick-up heads associated with said magnetic medium for detecting said recorded data, pulse sampling means, modulating means actuated by pulses from said sampling means to produce a series of pulses whose widths are proportional to the data amplitude at the instant of detection by one of said at least two magnetic pick-up heads, means recording said width modulated pulses on time delay means, a plurality of detecting means associated with said time delay means, said recording and detecting means together being capable of producing time delays from zero to times greater than the periods between sampling pulse time intervals, modulating means actuated by pulses from said pulse sampling means to produce a series of pulses whose amplitudes are proportional to the data amplitude at the instant of detection by the other of said at least two magnetic pick-up heads, switching means connecting said plurality of time delay detecting means one at a time to multiplier means, said multiplier means multiplying said series of width modulated pulses detected by the connected one of said plurality of time delay detecting means and said series of amplitude modulated pulses, means summing said multiplied pulses for the time length of the data portions to be correlated to obtain thereby correlation coefficients, and means for reading the sums of said multiplied pulses.

5. Apparatus for analyzing data in time series form as defined in claim 4, wherein said time delay means includes a drum coated with magnetic material.

6. In an apparatus for analyzing data as defined in claim 5, said detecting means associated with said magnetically coated drum being magnetic pickup heads spaced angularly around the periphery of said drum.

7. In an apparatus for analyzing data as defined in claim 5, said detecting means associated with said magnetically coated drum being magnetic pickup heads spaced closely and at equal angular distances around the periphery of said drum.

8. Apparatus for analyzing seismic data in time series form whereby correlation coefficients are computed for equal time length portions of said data to indicate the degree of correlation therebetween, the combination comprising a magnetic medium having recorded thereon at least one set of seismic data in time series form, at least two magnetic pick-up heads associated with said magnetic medium for detecting said recorded data, pulse sampling means, modulating means actuated by pulses from said sampling means to produce a series of pulses whose widths are proportional to the data amplitude at the instant of detection by one of said at least two magnetic pick-up heads, a recording head for recording said width modulated pulses on a cylindrical drum coated with magnetic material, a plurality of magnetic pick-up heads spaced in staggered relationship across the width of said drum capable of producing time delays from zero to times greater than the period between sampling pulses, modulating means actuated by pulses from said pulse sampling means to produce a series of pulses whose amplitudes are proportional to the data amplitude at the instant of detection by the other said at least two magnetic pick-up heads, switching means connecting said plurality of time delay pick-up heads one at a time to multiplier means, said multiplier means multiplying said series of width modulated pulses detected by the connected one of said plurality of time delay pick-up heads and said series of amplitude modulated pulses, means summing said multiplied pulses for the time length of the data portions to be correlated to obtain thereby correlation coefficients, and means for reading the sums of said multiplied pulses.

9. Apparatus for analyzing seismic data as defined in claim 8 wherein said record medium means has recorded thereon at least two sets of seismic data in time series form and one of said at least two sets of data is a seismic reflection signal representative of a seismic reflection signal expected to be present in the other of said at least two sets of data.

References Cited in the file of this patent

UNITED STATES PATENTS

| | | |
|---|---|---|
| 2,253,975 | Guanella | Aug. 26, 1941 |
| 2,614,327 | Russell | Oct. 21, 1952 |
| 2,643,819 | Yuk Wing Lee et al. | June 30, 1953 |
| 2,676,206 | Bennett et al. | Apr. 20, 1954 |
| 2,693,908 | Favre | Nov. 9, 1954 |
| 2,721,990 | McNaney | Oct. 25, 1955 |
| 2,725,191 | Ham | Nov. 29, 1955 |
| 2,779,428 | Silverman | Jan. 29, 1957 |

OTHER REFERENCES

The Review of Scientific Instruments, vol. 23, No. 7, July 1952, pages 347–349.

A Device for Computing Correlation Functions (Hastings and Meade).